(12) United States Patent
Wieker et al.

(10) Patent No.: US 12,457,106 B2
(45) Date of Patent: *Oct. 28, 2025

(54) SYSTEMS AND METHODS FOR DATA ACCESS CONTROL OF SECURE MEMORY USING A SHORT-RANGE TRANSCEIVER

(71) Applicant: Capital One Services, LLC, McLean, VA (US)

(72) Inventors: Jeffrey Wieker, Fairfax, VA (US); Patrick Zearfoss, Leesburg, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,703

(22) Filed: Aug. 10, 2023

(65) Prior Publication Data
US 2023/0388124 A1    Nov. 30, 2023

Related U.S. Application Data

(63) Continuation of application No. 17/881,365, filed on Aug. 4, 2022, now Pat. No. 11,764,962, which is a
(Continued)

(51) Int. Cl.
*H04L 29/06*    (2006.01)
*G06F 3/06*    (2006.01)
(Continued)

(52) U.S. Cl.
CPC .......... *H04L 9/3213* (2013.01); *G06F 3/0623* (2013.01); *G06F 3/064* (2013.01); *H04W 4/80* (2018.02); *G06F 3/0673* (2013.01)

(58) Field of Classification Search
CPC ..... H04L 9/3213; G06F 3/064; G06F 3/0623; G06F 3/0673; H04W 4/80
See application file for complete search history.

(56) References Cited

U.S. PATENT DOCUMENTS 5,412,723 A    5/1995    Canetti et al.
5,862,220 A    1/1999    Perlman
(Continued)

FOREIGN PATENT DOCUMENTS

CN    105308898 A    2/2016
EP    2974119 A1    1/2016
(Continued)

OTHER PUBLICATIONS

Notification of Transmittal of the International Search Report and the Written Opinion of the International Searching Authority from Application No. PCT/US2020/055363 dated Jan. 27, 2021.
(Continued)

*Primary Examiner* — Shawnchoy Rahman
(74) *Attorney, Agent, or Firm* — KDW Firm PLLC; Andrew D. Kasnevich

(57) ABSTRACT

Systems and methods for controlling data access through the interaction of a short-range transceiver, such as a contactless card, with a client device are presented. Data access control may be provided in the context of creating and accessing a secure memory block in a client device, including handling requests to obtain, create, and access a secure memory block via the interaction of a short-range transceiver, such as a contactless card, with a client device such that, once the secure memory block is created in memory of the client device, personal user data may be stored in the secure memory block, and access to the stored personal user data may only be provided to users authorized to review the data.

20 Claims, 13 Drawing Sheets

Related U.S. Application Data continuation of application No. 16/906,653, filed on Jun. 19, 2020, now Pat. No. 11,444,770, which is a continuation of application No. 16/657,415, filed on Oct. 18, 2019, now Pat. No. 10,742,414.

(51) Int. Cl.
*H04L 9/32* (2006.01)
*H04W 4/80* (2018.01)

(56) References Cited

U.S. PATENT DOCUMENTS

| | | |
|---|---|---|
| 8,880,027 B1 | 11/2014 | Darringer |
| 9,119,076 B1 | 8/2015 | Gubbi |
| 9,262,641 B1 | 2/2016 | Laughlin et al. |
| 9,848,324 B1 | 12/2017 | Abene et al. |
| 10,102,510 B2 | 10/2018 | Yau et al. |
| 10,438,437 B1 | 10/2019 | Herrington et al. |
| 10,510,074 B1 | 12/2019 | Rule et al. |
| 10,812,475 B2 * | 10/2020 | Covdy ............... H04L 63/0442 |
| 2002/0122553 A1 | 9/2002 | Kao et al. |
| 2003/0033537 A1 | 2/2003 | Fujimoto et al. |
| 2004/0190038 A1 | 9/2004 | Shahindoust |
| 2005/0223233 A1 | 10/2005 | Ishidera |
| 2007/0277230 A1 | 11/2007 | Hawkins et al. |
| 2008/0046988 A1 | 2/2008 | Baharis et al. |
| 2009/0240947 A1 | 9/2009 | Goyal et al. |
| 2009/0265776 A1 | 10/2009 | Baentsch et al. |
| 2010/0009658 A1 | 1/2010 | Wu et al. |
| 2012/0084806 A1 | 4/2012 | Fahrny et al. |
| 2012/0089849 A1 | 4/2012 | Tsai |
| 2012/0178420 A1 | 7/2012 | Ould |
| 2012/0297206 A1 | 11/2012 | Nord et al. |
| 2012/0317655 A1 | 12/2012 | Zhang et al. |
| 2012/0324554 A1 | 12/2012 | Gomez Martinez et al. |
| 2013/0169434 A1 | 7/2013 | McCown et al. |
| 2013/0185772 A1 | 7/2013 | Jaudon et al. |
| 2013/0239202 A1 | 9/2013 | Adams et al. |
| 2014/0059671 A1 | 2/2014 | Celi, Jr. et al. |
| 2015/0004937 A1 | 1/2015 | Kremen et al. |
| 2015/0006894 A1 | 1/2015 | Bandyopadhyay et al. |
| 2015/0019892 A1 | 1/2015 | Agrawal et al. |
| 2015/0082403 A1 | 3/2015 | Yang et al. |
| 2015/0121108 A1 | 4/2015 | Agrawal et al. |
| 2015/0143135 A1 | 5/2015 | Ueda et al. |
| 2015/0188896 A1 | 7/2015 | Slick et al. |
| 2015/0227733 A1 | 8/2015 | Yu |
| 2015/0312038 A1 | 10/2015 | Palanisamy |
| 2016/0065374 A1 | 3/2016 | Sauerwald et al. |
| 2016/0127365 A1 | 5/2016 | Bares et al. |
| 2016/0164852 A1 | 6/2016 | McCoy et al. |
| 2016/0261592 A1 | 9/2016 | Hubert et al. |
| 2017/0124307 A1 | 5/2017 | Reitsma et al. |
| 2017/0147809 A1 | 5/2017 | Boss et al. |
| 2017/0221047 A1 | 8/2017 | Veerasangappa Kadi et al. |
| 2017/0242802 A1 | 8/2017 | Yang |
| 2018/0027411 A1 | 1/2018 | Taneja |
| 2018/0189193 A1 | 7/2018 | Bernat et al. |
| 2018/0218467 A1 | 8/2018 | Blankenbeckler et al. |
| 2018/0302443 A1 | 10/2018 | Weiss et al. |
| 2019/0050593 A1 | 2/2019 | Khassanov et al. |
| 2019/0058583 A1 * | 2/2019 | Canepa ............... H04L 9/088 |
| 2020/0127376 A1 | 4/2020 | Kang |

FOREIGN PATENT DOCUMENTS

| | | |
|---|---|---|
| JP | 2000049687 A | 2/2000 |
| JP | 2000276457 A | 10/2000 |
| JP | 2002033727 A | 1/2002 |
| JP | 2003131929 A | 5/2003 |
| JP | 2004336719 A | 11/2004 |
| JP | 2006246392 A | 9/2006 |
| JP | 2009278614 A | 11/2009 |
| JP | 2017059168 A | 3/2017 |
| KR | 20150098595 A | 8/2015 |
| KR | 20170075383 A | 7/2017 |
| WO | 2014132572 A1 | 9/2014 |
| WO | 2017189173 A1 | 11/2017 |

OTHER PUBLICATIONS

Notification Concerning Transmittal of International Preliminary Report on Patentability from related PCT Application No. PCT/US2020/055363, mailed Apr. 28, 2022.

Zugenmaier et al., "Transparent Encryption for External Storage Media with Key Management Adapted to Mobile Use", 2009 Annual Computer Security Applications Conference, Honolulu, HI, USA, 2009, pp. 333-339, doi: 1.1109/ACSAC:2009.38 (Year: 2009).

* cited by examiner

SYSTEM 100

SYSTEM 100

SYSTEMS AND METHODS FOR DATA ACCESS CONTROL OF SECURE MEMORY USING A SHORT-RANGE TRANSCEIVER

CROSS-REFERENCE TO RELATED APPLICATIONS

The subject application is a continuation of U.S. patent application Ser. No. 17/881,365 filed Aug. 4, 2022, which is a continuation of U.S. patent application Ser. No. 16/906,653 filed Jun. 19, 2020, now U.S. Pat. No. 11,444,470, which is a continuation of U.S. patent application Ser. No. 16/657,415 filed Oct. 18, 2019, now U.S. Pat. No. 10,742,414, the contents of which are hereby incorporated by reference in their entireties.

FIELD OF THE DISCLOSURE

The present disclosure relates generally to user data control and, more specifically, to an exemplary system and method for active control of creating and accessing a secure memory block through the interaction of a short-range transceiver with a client device.

BACKGROUND

A typical user has personal user information or data that may be of a sensitive or confidential nature, including, for example, such information as personal identity information, social security number, account information, financial information, etc. When a user creates an account, the user will generally provide a certain amount of personal, identifying information regarding the user, as well as information for account access such as a username and password. Entities other than the user may add to the personal user data. Different entities may have, for example, different user data retention policies, different use policies, and different user data sharing policies. The policies of using user-information may further change without any notification to the user. In addition, the possessor of the user information may also change through a merger or buy-out of one entity by another, many times without any notice to the user.

Account access will often rely on log-in credentials (e.g., username and password) to confirm a cardholder's identity. However, if the log-in credentials are compromised, another person could have access to the user's account and, potentially, to the user's sensitive or confidential information or data. In addition, the more entities or individuals that a user shares their personal information with, the greater the risk of the user's information being stolen by a breach at one of the entities. Further, a user may only desire to share certain pieces of personal information with an entity or individual for limited purposes or limited in time.

Thus, it may be beneficial to provide exemplary systems and methods which allow users to control the use of user information to overcome at least some of the deficiencies described herein.

SUMMARY

Aspects of the disclosed technology include systems and methods for controlling data access through the interaction of a short-range transceiver, such as a contactless card, with a client device. Data access control may be provided in the context of creating and accessing a secure memory block in a client device via the interaction of a short-range transceiver, such as a contactless card, with a client device such that personal user data may be stored on a client device and remain protected from unauthorized access.

Embodiments of the present disclosure provide a data access control system, comprising: a server configured for data communication with a client device associated with a user; a contactless card associated with the user, the contactless card comprising a communications interface, a processor, and a memory, the memory storing an applet and a user token; a client application comprising instructions for execution on the client device, the client application configured to: in response a tap action between the contactless card and the client device: receive the user token from the contactless card; and transmit to the server the user token and a request for a data storage key; receive from the server the data storage key; create a secure memory block in a memory of the client device; and encrypt the secure memory block using the data storage key; and, a processor in data communication with the server, the processor configured to: receive from the client device the user token and the request for the data storage key; identify the user based on the user token; verify that the user is authorized to create the secure memory block in the client device; and transmit to the client device the data storage key.

Embodiments of the present disclosure provide a method for controlling data access, comprising: providing a contactless card comprising a communications interface, a processor, and a memory, the memory storing an applet and a user token, the user token comprising a user key, wherein the communications interface is configured to support at least one of near field communication, Bluetooth, or Wi-Fi, and wherein the contactless card is associated with a user; providing a client application comprising instructions for execution on a client device associated with the user, the client device having an encrypted secure memory block storing personal user data, the client application configured to: receive the user token from the contactless card; in response a tap action between the contactless card and the client device: receive the user token from the contactless card; and transmit to the server the user token and a request for a data access key; receive from the server the data access key; and decrypt the secure memory block using the data access key; receiving from the client device the user token and the request for the data access key; identifying the user based on the user token; verifying that the user is authorized to access the secure memory block in the client device; and transmitting to the client device the data access key.

Embodiments of the present disclosure provide a non-transitory machine-readable medium having stored thereon an application comprising program code for execution on a client device, the client device associated with a user, the client device configured to communicate over a short-range communication field with a contactless card associated with the user, the contactless card comprising memory storing a user token, the application configured to, when executed, perform procedures comprising: in response a tap action between the contactless card and the client device: receiving the user token from the contactless card; and transmitting to a server the user token and a request for a data storage key; receiving from the server the data storage key; creating a secure memory block in a memory of the client device; storing personal user data in the secure memory block; and encrypting the secure memory block using the data storage key.

Further features of the disclosed design, and the advantages offered thereby, are explained in greater detail here-

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Exemplary embodiments of the disclosed systems and methods provide for controlling data access through the interaction of a short-range transceiver, such as a contactless card, with a client device. Data access control may be provided in the context of creating and accessing a secure memory block in a client device. Requests to create or access a secure memory block in a client device may be handled via the interaction of a short-range transceiver, such as a contactless card, with a client device such that, once the secure memory block is created in memory of the client device, personal user data may be stored in the secure memory block, and access to the stored personal user data may only be provided to users authorized to review the data. Benefits of the disclosed technology may include improved data security for personal user data, improved access to personal user data which may be stored in and retrieved from a more convenient location (i.e., a client device such as a mobile phone), and improved user experience.

Figure 1A:
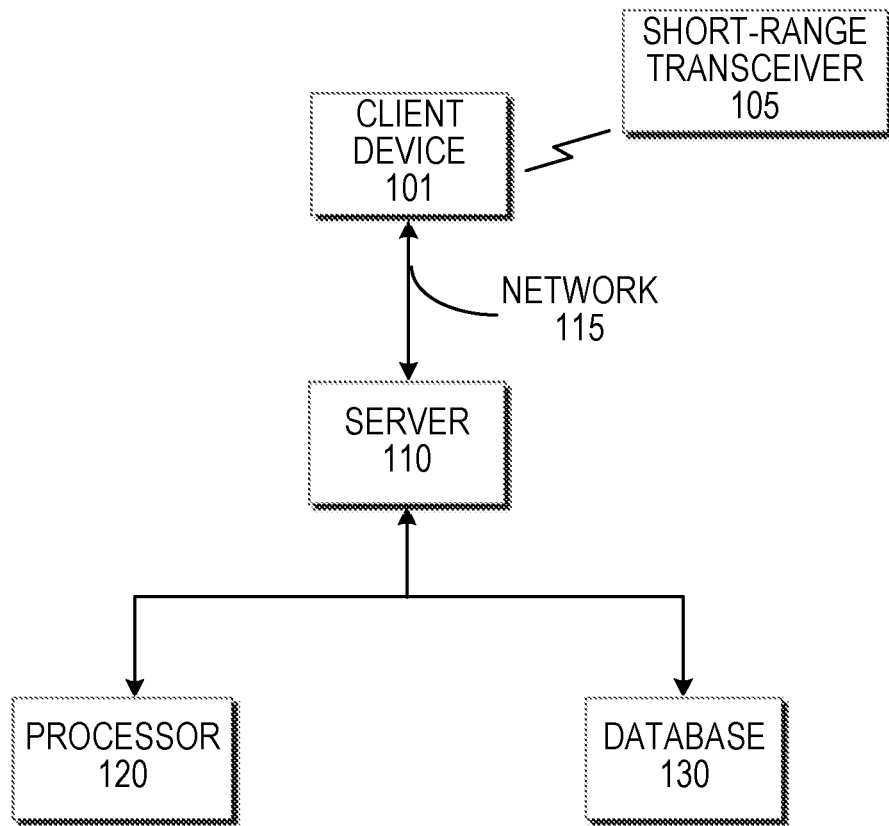
FIG. 1A is a diagram of a data access control system according to one or more example embodiments.

FIG. 1A shows a diagram illustrating a data access control system 100 according to one or more example embodiments. As discussed further below, system 100 may include client device 101, short-range transceiver 105, server 110, processor 120 and database 130. Client device 101 may communicate with server 110 via network 115. Although FIG. 1 illustrates certain components connected in certain ways, system 100 may include additional or multiple components connected in various ways.

System 100 may include one or more client devices, such as client device 101, which may each be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. Client device 101 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. Additional features that may be included in a client device, such as client device 101, are further described below with reference to FIG. 2.

System 100 may include one or more short-range transceivers, such as short-range transceiver 105. Short-range transceiver 105 may be in wireless communication with a client device, such as client device 101, within a short-range communications field such as, for example, near field communication (NFC). Short-range transceiver 105 may include, for example, a contactless card, a smart card, or may include a device with a varying form factor such as a fob, pendant or other device configured to communicate within a short-range communications field. In other embodiments, short-range transceiver 105 may be the same or similar as client device 101. Additional features that may be included in a short-range transceiver, such as such as short-range transceiver 105, are further described below with reference to FIG. 3.

System 100 may include one or more servers 110. In some example embodiments, server 110 may include one or more processors (such as, e.g., a microprocessor) which are coupled to memory. Server 110 may be configured as a central system, server or platform to control and call various data at different times to execute a plurality of workflow actions. Server 110 may be a dedicated server computer, such as bladed servers, or may be personal computers, laptop computers, notebook computers, palm top computers, network computers, mobile devices, or any processor-controlled device capable of supporting the system 100.

Server 110 may be configured for data communication (such as, e.g., via a connection) with one or more processors, such as processor 120. In some example embodiments, server 110 may incorporate processor 120. In some example embodiments, server 110 may be physically separate and/or remote from processor 120. Processor 120 may be configured to serve as a back-end processor. Processor 120 may be configured for data communication (such as, e.g., via a connection) with database 130 and/or server 110. Processor 120 may include one or more processing devices such as a microprocessor, RISC processor, ASIC, etc., along with associated processing circuitry. Processor 120 may include, or be connected to, memory storing executable instructions and/or data. Processor 120 may communicate, send or receive messages, requests, notifications, data, etc. to/from other devices, such as client devices 101 and/or 103, via server 110.

Server 110 may be configured for data communication (such as, e.g., via a connection) with one or more databases, such as database 130. Database 130 may be a relational or non-relational database, or a combination of more than one database. In some example embodiments, server 110 may incorporate database 130. In some example embodiments, database 130 may be physically separate and/or remote from server 110, located in another server, on a cloud-based platform, or in any storage device that is in data communication with server 110.

Connections between server 110, processor 120 and database 130 may be made via any communications line, link or network, or combination thereof, wired and/or wireless, suitable for communicating between these components. Such network may include network 115 and/or one or more networks of same or similar type as those described herein with reference to network 115. In some example embodiments, connections between server 110, processor 120 and database 130 may include a corporate LAN.

Server 110 and/or database 130 may include user login credentials used to control access to user accounts. The login credentials may include, without limitation, user names, passwords, access codes, security questions, swipe patterns, image recognition, identification scans (e.g., driver's license scan and passport scan), device registrations, telephone numbers, email addresses, social media account access information, and biometric identification (e.g., voice recognition, fingerprint scans, retina scans, and facial scans).

Database 130 may contain data relating to one or more users and one or more accounts. Data relating to a user may include a user identifier and a user key, and may be maintained or organized in one or more accounts. Accounts may be maintained by (or on behalf of) and/or relate to any one or more of a variety of entities, such as, for example (and without limitation) a bank, merchant, online retailer, service provider, merchandizer, manufacturer, social media provider, provider or promoter of sporting or entertainment events, or hotel chain. For example, database 130 may include, without limitation, account identification information (e.g., account number, account owner identification number, account owner name and contact information—any one or more of which may comprise an account identifier), account characteristics (e.g., type of account, funding and trading limitations, and restrictions on access and other activity), and may include information and data pertinent to the account, including financial (such as balance information, payment history, and transaction history), social and/or personal information. Data stored in database 130 may be stored in any suitable format, and may be encrypted and stored in a secure format to prevent unauthorized access. Any suitable algorithm/procedure may be used for data encryption and for authorized decryption.

Server 110 may be configured to communicate with one or more client devices, such as such as client device 101, via one or more networks, such as network 115. Network 115 may include one or more of a wireless network, a wired network or any combination of wireless network and wired network, and may be configured to connect client device 101 to server 110. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more example embodiments, network 115 may comprise a plurality of interconnected networks, such as, for example, the Internet, a service provider's network, a cable television network, corporate networks, such as credit card association networks, a LAN, and/or home networks.

In some example embodiments, server 110 may access records, including records in database 130, to determine a method or methods for communicating with client device 101. The communication method may include an actionable push notification with an application stored on client device 101. Other communication methods may include a text message or an e-mail, or other messaging techniques appropriate in a network-based client/server configuration. Messages or requests by client device 101 may be communicated to server 110 via an application on the client device, or may be sent by a text message or an e-mail, or other messaging techniques appropriate in a network-based client/server configuration. Communications originating with client device 101 may be sent to server 110 using the same communications method as communications originating with server 110, or via a different communications method.

Figure 1B:
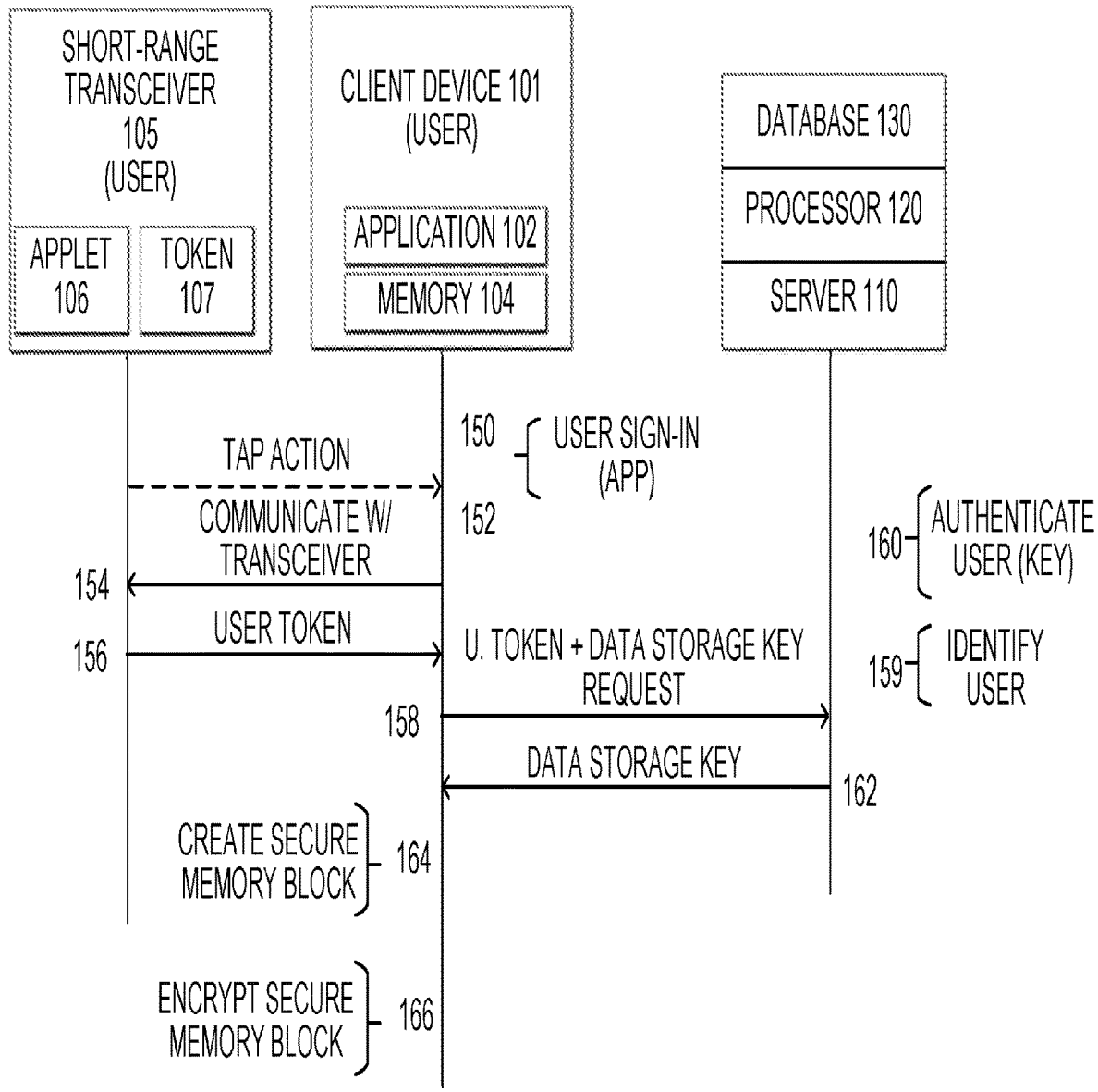
FIG. 1B is a diagram illustrating a sequence for providing data access control according to one or more example embodiments.

FIG. 1B shows a diagram illustrating a sequence for providing data access control according to one or more example embodiments, which may include a request by a user for a data storage key to create a secure memory block in a client device. FIG. 1B references similar components of example embodiment system 100 as illustrated in FIG. 1A. Client device 101 may be associated with a user. Client device 101 may include application 102, which may include instructions for execution by client device 101, and memory 104. Client device 101 may include features further described below with reference to FIG. 2. Application 102 may be configured to provide a user interface for the user when using client device 101. Application 102 may be configured to communicate, via client device 101, with other client devices, with short-range transceiver 105, and with server 110. Application 102 may be configured to receive requests and send messages as described herein with reference to client device 101. User information, including identifiers and/or keys, may be stored in database 130.

Short-range transceiver 105 may be associated with a user. Short-range transceiver 105 may include, for example, a contactless card, and may include features further described below with reference to FIG. 3. Short-range transceiver 105 may have memory storing an applet 106 and/or a token 107. Token 107 may be associated with the user.

A token may be used to increase security through token authorization. Server 110 may send a validation request to a client device, such as client device 101, receive responsive information from the client device, and if validated, send a validation token back to the client device. The validation token may be based on a pre-determined token, or may be a dynamic token based on an algorithm that can be secret and known only to server 110 and the client device; the algorithm may include live parameters independently verifiable by the participants, such as the temperature at a particular location or the time. The token may be used to verify the identity of the user. The validation request and/or validation token may be based on token 107 stored on short-range transceiver 105.

At label 150, the user may sign in or login to application 102 running on client device 101. Sign-in or login may be accomplished via, e.g., entering a username and password, or scanning a biometric image such as a fingerprint scan, retina scan, facial scan, etc. In some example embodiments, application 102 may display an instruction on client device 101 prompting the user to initiate a tap action between short-range transceiver 105 and client device 101. As used herein, a tap action may include tapping short-range transceiver 105 against client device 101 (or vice-versa). For example, if short-range transceiver 105 is a contactless card and client device 101 is a mobile device, the tap action may include tapping the contactless card on a screen or other portion of client device 101. However, a tap action is not limited to a physical tap by short-range transceiver 105 against client device 101, and may include other gestures, such as, e.g., a wave or other movement of short-range transceiver 105 in the vicinity of client device 101 (or vice-versa).

At label 152, there may be a tap action between short-range transceiver 105 and client device 101. The tap action may be in response to a prompt displayed on client device 101.

At label 154, application 102 may communicate (via client device 101) with short-range transceiver 105 (e.g., after short-range transceiver 105 is brought near client device 101). Communication between application 102 and short-range transceiver 105 may involve short-range transceiver 105 (such as, e.g., a contactless card) being sufficiently close to a card reader (not shown) of the client device 101 to enable NFC data transfer between application 102 and short-range transceiver 105, and may occur in conjunction with (or response to) a tap action between short-range transceiver 105 and client device 101 (such as, e.g., the tap action at label 152). The communication may include exchange of data or commands to establish a communication session between application 102 and short-range transceiver 105. The exchange of data may include transfer or exchange of one or more keys, which may be preexisting keys or generated as session keys. In some example embodiments, the communication may occur upon entry of short-range transceiver 105 into a short-range communication field of client device 101 prior to a tap action between short-range transceiver 105 and client device 101.

At label 156, short-range transceiver 105 may send user token 107 associated with the user to application 102. Token 107 may include a user identifier. In some example embodiments, user token 107 may include a key associated with the user. In some example embodiments, the sending of user token 107 to application 102 may be in conjunction with (or response to) a tap action between short-range transceiver 105 and client device 101 (such as, e.g., the tap action at label 152). In some example embodiments, the sending of user token 107 to application 102 may occur upon entry of short-range transceiver 105 into a short-range communication field of client device 101 prior to a tap action between short-range transceiver 105 and client device 101. In addition to user token 107, short-range transceiver may send other data to application 102, including data such as a counter, public key, other information, etc. (or these data items may be included in user token 107).

At label 158, application 102 may send the user token to server 110, along with a request for a data storage key. This may be carried out in response to a tap action between short-range transceiver 105 and client device 101 (such as, e.g., the tap action at label 152). The data storage key may enable the user to encrypt a secure memory block created as described further herein.

At label 159, processor 120 may receive (e.g. via server 110) the user token and the data storage key request. Processor 120 may use the user token to identify the user. In some example embodiments, identifying the user may be carried out by using a user identifier in the token to look up information in database 130. In some example embodiments, at label 160, if the user token includes a key associated with the user, processor 120 may use the user key to authenticate the user. Based on the identity of the user (and as such identity may be authenticated), processor 120 may verify whether the user is authorized to create a secure memory block in the memory 104 of client device 101 and to receive a data storage key to be used for securing that memory block.

At label 162, processor 120 may send the data storage key to client device 101. As mentioned above, processor 120 may verify that the user is authorized to create a secure memory block in the memory 104 of client device 101 and receive the data storage key. The data storage key may be stored in database 130, or may be generated based on the user key. Generating the data storage key based on the user key may include using a counter or other data derived or otherwise maintained in synchronization between processor 120, client device 101 and/or short-range transceiver 105; for example, a data storage key may be generated by encrypting such a counter value or other data value with the user key. The user key may be stored in database 130 or included in user token 107. In one or more example embodiments, application 102 may generate a new data storage key based on a combination of the received data storage key and data received from short-range transceiver 105 (such as user token 107, which may include a user key, or other data which may include a second user key).

In an example embodiment, processor 120 may instead send a denial notification (not shown) to client device 101, indicating that the user is not authorized to create a secure memory block in the memory 104 of client device 101 and receive the data storage key.

At label 164, application 102 may create a secure memory block within memory 104 by, e.g., creating a memory partition for a block of memory within memory 104 or allocating a block of memory within memory 104.

In some example embodiments, application 102 may store personal user data in the newly-created secure memory block. In some example embodiments, application 102 may store or update personal user data in the secure memory block at another time. Personal user data may include personal identifying data and/or other personal user information or data that may be of a sensitive or confidential nature, such as, for example, name, address, date of birth, gender, social security number, driver's license number and associated data (including actual digital driver's license), credit card or other financial information, account information for financial, social, utility, services, or other accounts, medical data, academic data, etc. Personal user data may include files relating to sensitive items such as legal documents, mortgages, wills, etc., and photos of sensitive items such as photo of driver's license, ID cards, credit cards, etc. Personal user data may also include secure keys such as fast identity online (FIDO) keys, blockchain keys, etc.

At label 166, application 102 may encrypt the secure memory block using the data storage key (either as received or newly-generated), thereby making the secure memory block secure against unauthorized access, while permitting authorized access at a later time as further described herein. Any suitable algorithm/procedure may be used for data encryption and for authorized decryption. In one or more example embodiments, the data storage key may be stored on client device 101.

In one or more example embodiments, application 102 may, without communicating with processor 120 or server 110, create a secure memory block within memory 104 as described above with reference to label 164. Once application 102 has created the secure memory block within memory 104, application 102 may encrypt the secure memory block using a data storage key received from short-range transceiver 105 or generated based on data received from short-range transceiver 105 (such as user token 107, which may include a user key, or other data which may include a second user key). Generating the data storage key based on data received from short-range transceiver 105 may include using a counter or other data derived or otherwise maintained in synchronization between client device 101 and short-range transceiver 105; for example, a data storage key may be generated by encrypting such a counter value or other data value with the user key. Before encrypting the secure memory block, application 102 may store personal user data in the newly-created secure memory block. One or more of the steps involved in creating a secure memory block within memory 104 and encrypting the secure memory block may be responsive to a tap action between short-range transceiver 105 and client device 101.

In an example embodiment, application 102 may be launched in response to a tap action between short-range transceiver 105 and client device 101.

Figure 1C:
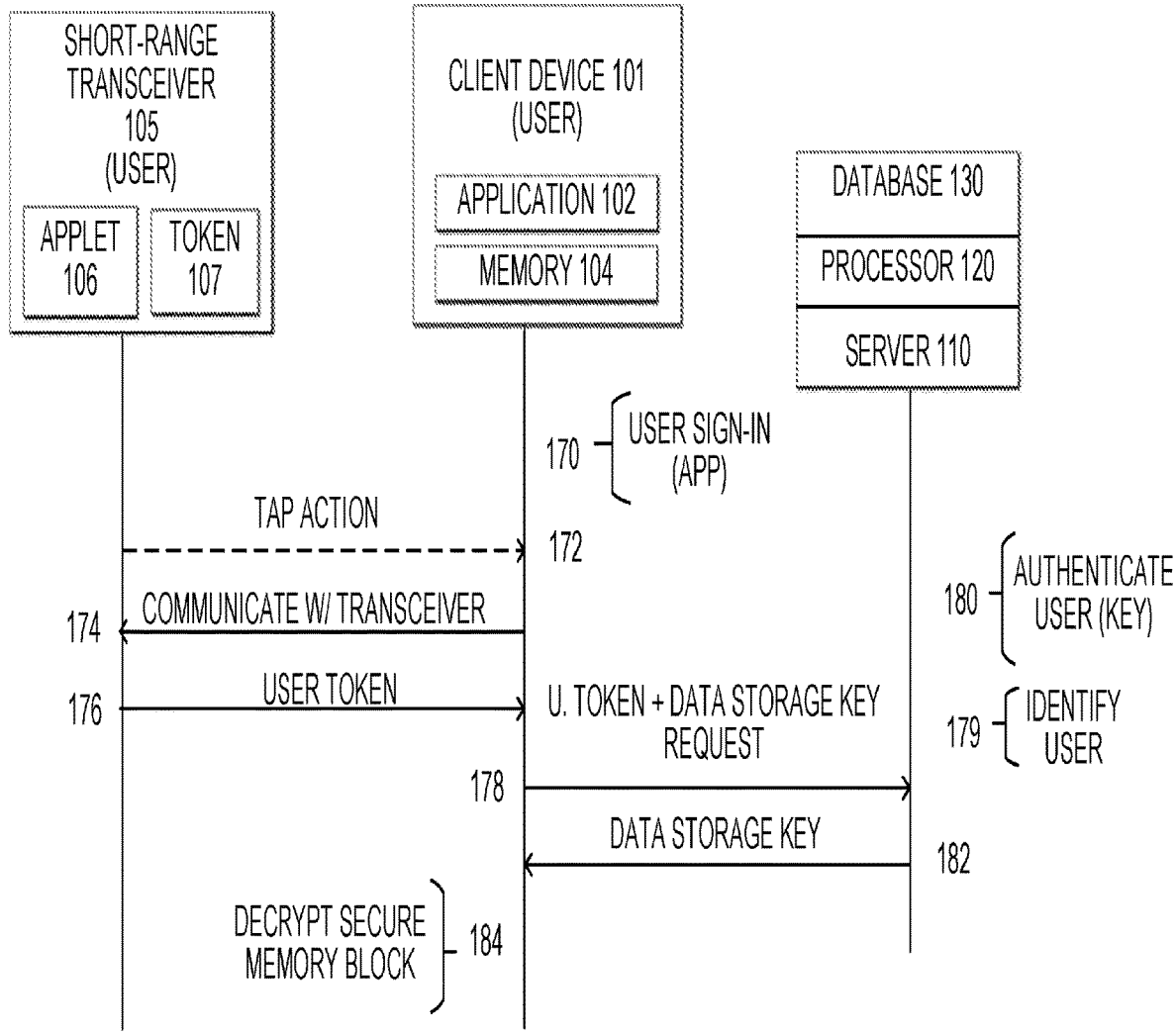
FIG. 1C is a diagram illustrating a sequence for providing data access control according to one or more example embodiments.

FIG. 1C shows a diagram illustrating a sequence for providing data access control according to one or more example embodiments, which may include a request by a user for a data access key to access or decrypt a secure memory block previously created in a client device as described herein. FIG. 1C references similar components of example embodiment system 100 as illustrated in FIGS. 1A and 1B.

At label 170, the user may sign in or login to application 102 running on client device 101. Sign-in or login may be accomplished via, e.g., entering a username and password, or scanning a biometric image such as a fingerprint scan, retina scan, facial scan, etc. In some example embodiments, application 102 may display an instruction on client device 101 prompting the user to initiate a tap action between short-range transceiver 105 and client device 101.

At label 172, there may be a tap action between short-range transceiver 105 and client device 101. The tap action may be in response to a prompt displayed on client device 101.

At label 174, application 102 may communicate (via client device 101) with short-range transceiver 105 (e.g., after short-range transceiver 105 is brought near client device 101). Communication between application 102 and short-range transceiver 105 may involve short-range transceiver 105 (such as, e.g., a contactless card) being sufficiently close to a card reader (not shown) of the client device 101 to enable NFC data transfer between application 102 and short-range transceiver 105, and may occur in conjunction with (or response to) a tap action between short-range transceiver 105 and client device 101. The communication may include exchange of data or commands to establish a communication session between application 102 and short-range transceiver 105. The exchange of data may include transfer or exchange of one or more keys, which may be preexisting keys or generated as session keys. In some example embodiments, the communication may occur upon entry of short-range transceiver 105 into a short-range communication field of client device 101 prior to a tap action between short-range transceiver 105 and client device 101.

At label 176, short-range transceiver 105 may send user token 107 associated with the user to application 102. Token 107 may include a user identifier. In some example embodiments, user token 107 may include a key associated with the user. In some example embodiments, the sending of user token 107 to application 102 may be in conjunction with (or response to) a tap action between short-range transceiver 105 and client device 101 (such as, e.g., the tap action at label 172). In some example embodiments, the sending of user token 107 to application 102 may occur upon entry of short-range transceiver 105 into a short-range communication field of client device 101 prior to a tap action between short-range transceiver 105 and client device 101.

At label 178, application 102 may send the user token to server 110, along with a request for a data access key. This may be carried out in response to a tap action between short-range transceiver 105 and client device 101 (such as, e.g., the tap action at label 172). The data access key may enable the user to decrypt a secure memory block in client device 101 (the secure memory block previously created and encrypted according to the techniques described herein) and store, read, update or otherwise access personal user data stored in the secure memory block.

At label 179, processor 120 may receive (e.g. via server 110) the user token and the data access key request. Processor 120 may use the user token to identify the user. In some example embodiments, identifying the user may be carried out by using a user identifier in the token to look up information in database 130. In some example embodiments, at label 180, if the user token includes a key associated with the user, processor 120 may use the user key to authenticate the user. Based on the identity of the user (and as such identity may be authenticated), processor 120 may verify whether the user is authorized to access a secure memory block in the memory 104 of client device 101 and to receive a data access key to be used for decrypting and accessing that memory block.

At label 182, processor 120 may send the data access key to client device 101. As mentioned above, processor 120 may verify that the user is authorized to access the secure memory block in the memory 104 of client device 101 and receive the data access key. The data access key may be stored in database 130, or may be generated based on the user key. Generating the data access key based on the user key may include using a counter or other data derived or otherwise maintained in synchronization between processor 120, client device 101 and/or short-range transceiver 105; for example, a data access key may be generated by encrypting such a counter value or other data value with the user key. The user key may be stored in database 130 or included in user token 107. In one or more example embodiments, application 102 may generate a new access key based on a combination of the received data access key and data received from short-range transceiver 105 (such as user token 107, which may include a user key, or other data which may include a second user key) and use the newly-generated access key to decrypt the secure memory block.

In an example embodiment, processor 120 may instead send a denial notification (not shown) to client device 101, indicating that the user is not authorized to access the secure memory block in the memory 104 of client device 101 and receive the data access key.

At label 184, application 102 may decrypt the secure memory block using the data access key (either as received or newly-generated), thereby permitting authorized access to the secure memory block. In an example embodiment, the data access key may be stored on client device 101.

Application 102 may store, read, update or otherwise access personal user data stored in the secure memory block. In one or more example embodiments, application 102 may display the stored or updated personal user data on client device 101. In one or more example embodiments, application 102 may provide access to the stored or updated personal user data to a second application (not shown) executing on client device 101. In one or more example embodiments, access to the secure memory block (whether by application 102 or the second application) may be limited to a specific time, which may include a predetermined time period.

In one or more example embodiments, application 102 may re-encrypt the secure memory block, using the data storage key, the data access key, or another key generated from one or more of the data storage key, the data access key, and the user key. Re-encryption of the secure memory block may occur automatically, for example after expiration of a predetermined time period, or may occur upon user command.

In one or more example embodiments, application 102 may, without communicating with processor 120 or server 110, decrypt the secure memory block using a data access key received from short-range transceiver 105 or generated based on data received from short-range transceiver 105 (such as user token 107, which may include a user key, or other data which may include a second user key). Generating the data access key based on data received from short-range transceiver 105 may include using a counter or other data derived or otherwise maintained in synchronization between client device 101 and short-range transceiver 105; for example, a data access key may be generated by encrypting such a counter value or other data value with the user key. One or more of the steps involved in receiving or generating a data access key and decrypting the secure memory block may be responsive to a tap action between short-range transceiver 105 and client device 101.

In one or more example embodiments, a second application (not shown) executing on client device 101 (or on another device in communication with client device 101) may include functionality described herein for accessing the secure memory block. For example, program code available via a software development kit or an application programming interface could be embedded in the second application, the program code containing the functions necessary to obtain a data access key and then store, read, update or otherwise access personal user data stored in the secure memory block, as described above with reference to application 102.

In an example embodiment, application 102 may be launched in response to a tap action between short-range transceiver 105 and client device 101.

Figure 2:
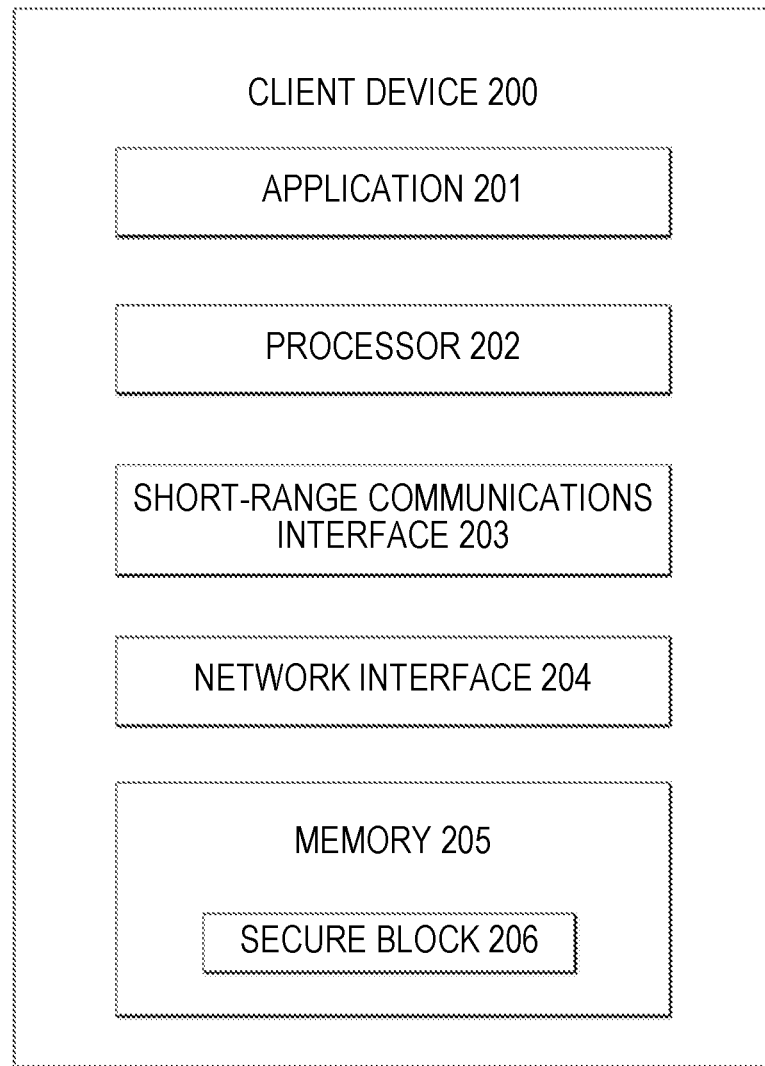
FIG. 2 illustrates components of a client device used in a data access control system according to one or more example embodiments.

FIG. 2 illustrates components of a client device 200 used in a data access control system according to one or more example embodiments. In one or more example embodiments, client device 200 may be one or more of client devices 101, described above with reference to FIG. 1A and FIGS. 1B-1C. Client device 200 may include one or more applications 201, one or more processors 202, a short-range communications interface 203, a network interface 204, and memory 205. Application 201 may include a software application or executable program code to be executed on processor 202 and configured to carry out features described herein for any client devices, such as client device 101, and/or any of the features described herein with reference to application 102. Application 201 may be configured, for example, to transmit and/or receive data with other devices via client device 101, such as, e.g., via short-range communications interface 203 and/or network interface 204. For example, application 201 may be configured to initiate one or more requests, such as near field data exchange requests to a short-range transceiver (such as a contactless card). Application 201 may also be configured to provide a user interface via a display (not shown) for a user of the client device. Application 201 may be stored in memory in client device 200; the memory may be part of memory 205 or may be separate from memory 205, and may include a read-only memory, write-once read-multiple memory and/or read/write memory, e.g., RAM, ROM, and EEPROM.

Processor 202 may include one or more processing devices such as a microprocessor, RISC processor, ASIC, etc., and may include associated processing circuitry. Processor 202 may include, or be connected to, memory storing executable instructions and/or data, as may be necessary or appropriate to control, operate or interface with the other features of client device 200, including application 201. Processor 202 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Short-range communications interface 203 may support communication via a short-range wireless communication field, such as NFC, RFID, or Bluetooth. Short-range communications interface 203 may include a reader, such as a mobile device NFC reader. Short-range communications interface 203 may be incorporated into network interface 204, or may be provided as a separate interface.

Network interface 204 may include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. Such network may include, without limitation, telephone lines, fiber optics, IEEE Ethernet 902.3, a wide area network, a local area network, a wireless personal area network, a wide body area network or a global network such as the Internet.

Memory 205 may include a read-only memory, write-once read-multiple memory and/or read/write memory, e.g., RAM, ROM, and EEPROM, and client device 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. Memory 205 may store one or more applications for execution by processor 202, and may also store data used by one or more applications that may be executed by processor 202.

Secure memory block 206 may be a block or partition of memory formed within memory 205, and/or may comprise a file established by the client device operating system. Secure memory block 206 may be created within memory 205 by, e.g., creating a memory partition for a block of memory within memory 205, or allocating a block of memory within memory 205, and may include creating, modifying or using a file established by the client device operating system. In one or more example embodiments, the memory block so partitioned or allocated may be contained within memory previously allocated for use by application 201 and thereby remain under the control of application 201. In one or more example embodiments, the memory block so partitioned or allocated may be contained within memory previously allocated for use generally by one or more applications executing on client device 200.

Client device 200 may also include a display (not shown). Such display may be any type of device for presenting visual information such as a computer monitor, a flat panel display, or a mobile device screen, including liquid crystal displays, light-emitting diode displays, plasma panels, and cathode ray tube displays.

Client device 200 may also include one or more device inputs (not shown). Such inputs may include any device for entering information into the client device that is available and supported by the client device 200, such as a touchscreen, keyboard, mouse, cursor-control device, touchscreen, microphone, digital camera, video recorder, or camcorder. The device inputs may be used to enter information and interact with the client device 200 and, by extension, with the systems described herein.

Figure 3:
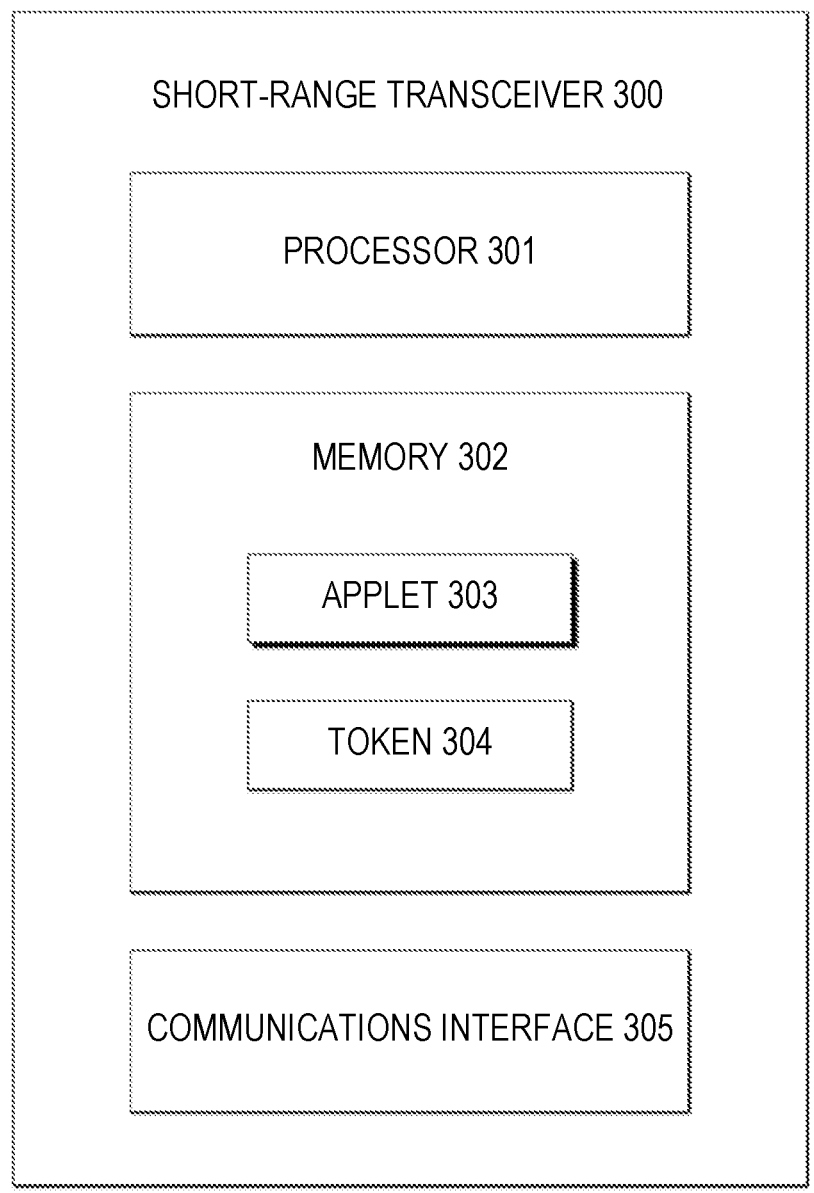
FIG. 3 illustrates components of a short-range transceiver used in a data access control system according to one or more example embodiments.

FIG. 3 illustrates components of a short-range transceiver 300 used in a data access control system according to one or more example embodiments. In one or more example embodiments, short-range transceiver 300 may be one or more of short-range transceiver 105, described above with reference to FIG. 1A and FIGS. 1B-1C. Short-range transceiver 300 may include, for example, a contactless card, a smart card, or may include a device with a varying form factor such as a fob, pendant or other device configured to communicate within a short-range communications field. Short-range transceiver 300 may include a processor 301, memory 302, and short-range communications interface 305.

Processor 301 may include one or more processing devices such as a microprocessor, RISC processor, ASIC, etc., and may include associated processing circuitry. Processor 301 may include, or be connected to, memory storing executable instructions and/or data, as may be necessary or appropriate to control, operate or interface with the other features of short-range transceiver 300, including applet 303. Processor 301 (including any associated processing circuitry) may contain additional components including processors, memories, error and parity/CRC checkers, data encoders, anticollision algorithms, controllers, command decoders, security primitives and tamperproofing hardware, as necessary to perform the functions described herein.

Memory 302 may be a read-only memory, write-once read-multiple memory and/or read/write memory, e.g., RAM, ROM, and EEPROM. Memory 302 may be configured to store one or more applets 303 and one or more tokens 304. Applet 303 may comprise one or more software applications configured to execute on processor 301, such as a Java Card applet that may be executable on a contactless card. However, it is understood that applet 303 is not limited to Java Card applets, and instead may be any software application operable on contactless cards or other devices having limited memory. Applet 303 may be configured to respond to one or more requests, such as near field data exchange requests from a client device, including requests from a device having a reader such as a mobile device NFC reader. Applet 303 may be configured to read (or write) data, including token 304, from (or to) memory 302 and provide such data in response to a request.

Token 304 may include a unique alphanumeric identifier assigned to a user of the short-range transceiver 300, and the identifier may distinguish the user of the short-range transceiver 300 from other users of other short-range transceivers (such as other contactless card users). In some example embodiments, token 304 may identify both a customer and an account assigned to that customer and may further identify the short-range transceiver (such as a contactless card) associated with the customer's account. In some example embodiments, token 304 may include a key unique to the user or customer with which the short-range transceiver is associated.

Short-range communications interface 305 may support communication via a short-range wireless communication field, such as NFC, RFID, or Bluetooth. Short-range transceiver 300 may also include one or more antennas (not shown) connected to short-range communications interface 305 to provide connectivity with a short-range wireless communications field.

Figure 4:
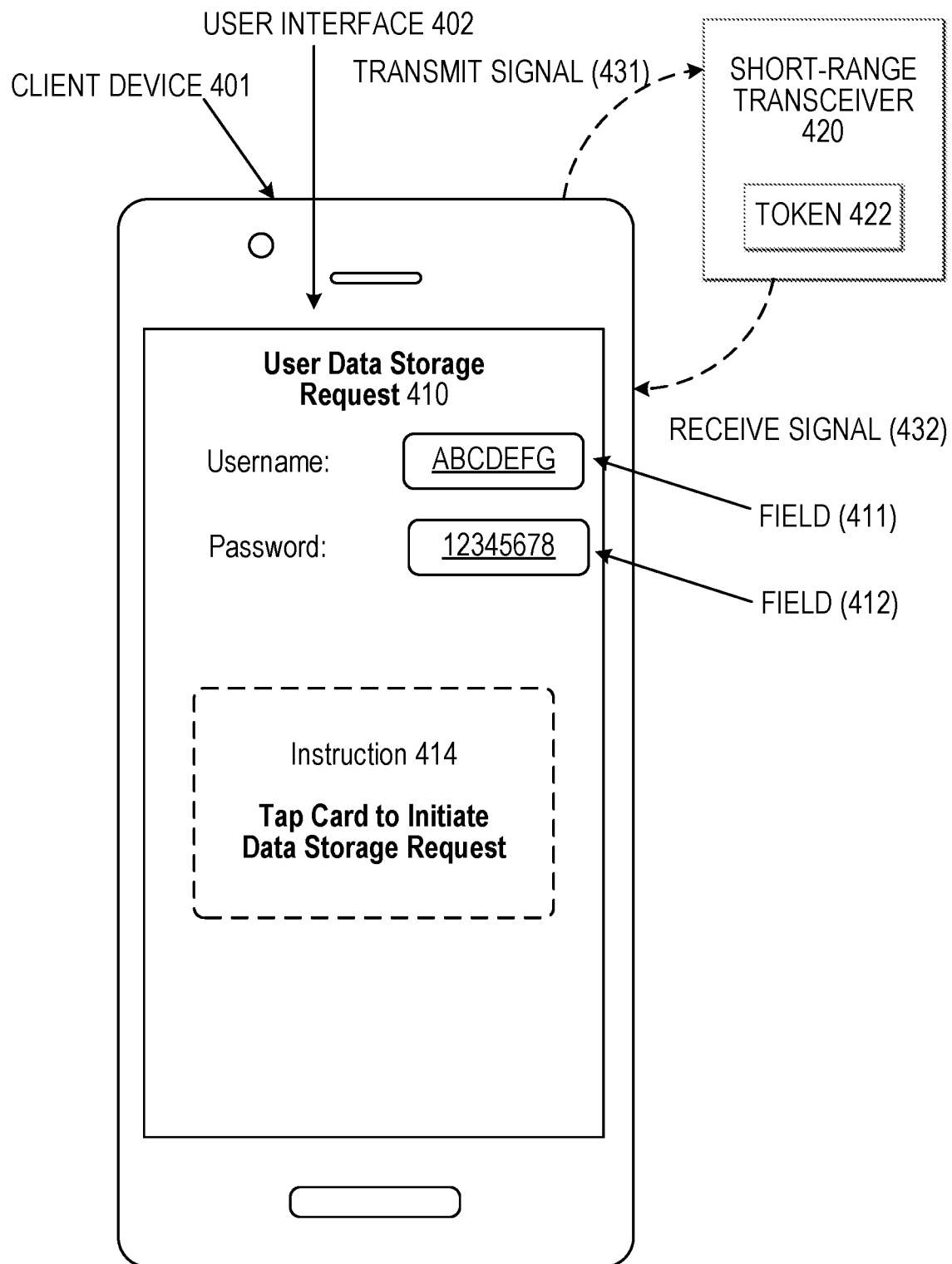
FIG. 4 is diagram illustrating interaction between a client device and a short-range transceiver used in a data access control system according to one or more example embodiments.

FIG. 4 is diagram illustrating the interaction 400 between a client device 401 and a short-range transceiver 420 used in a data access control system according to one or more example embodiments, including embodiments described above with reference to FIGS. 1A-1B. Client device 401 may be client device 101 associated with a user as described above with reference to FIGS. 1A-1B. User interface 402 may be generated by application 102 described above with reference to FIG. 1B. Short-range transceiver 420 may be short-range transceiver 105 described above with reference to FIGS. 1A-1B. Upon entry of short-range transceiver 420 into a short-range communication field of client device 401 (such as, e.g., via a tap action), client device 401 may communicate with short-range transceiver 420. Client device 401 may send data or commands to short-range transceiver 420 via transmit signal 431, and may receive data from short-range transceiver 420, including token 422, via receive signal 432. Communication between client device 401 and short-range transceiver 420 may proceed as described above with reference to FIG. 1B (e.g., client device 101 and short-range transceiver 105).

User interface 402 may present on client device 401 a screen display for a user data storage request 410, which may include field 411 and field 412. If necessary, the user may enter a username in field 411 and password in field 412; in some example embodiments, the user may scan a biometric image such as a fingerprint scan, retina scan, facial scan, etc. The screen display may include an instruction 414 prompting the user to tap short-range transceiver 420 (in the example shown, short-range transceiver 420 may be a contactless card) to initiate a data storage key request to obtain a data storage key required to create a secure memory block as described herein. Instruction 414 may be a push notification from server 110 (shown in FIG. 1A and FIGS. 1B-1C). Client device 401 may transmit a data storage key request to server 110 along with a user token 422 (from short-range transceiver 420) in response to a tap action.

Figure 5:
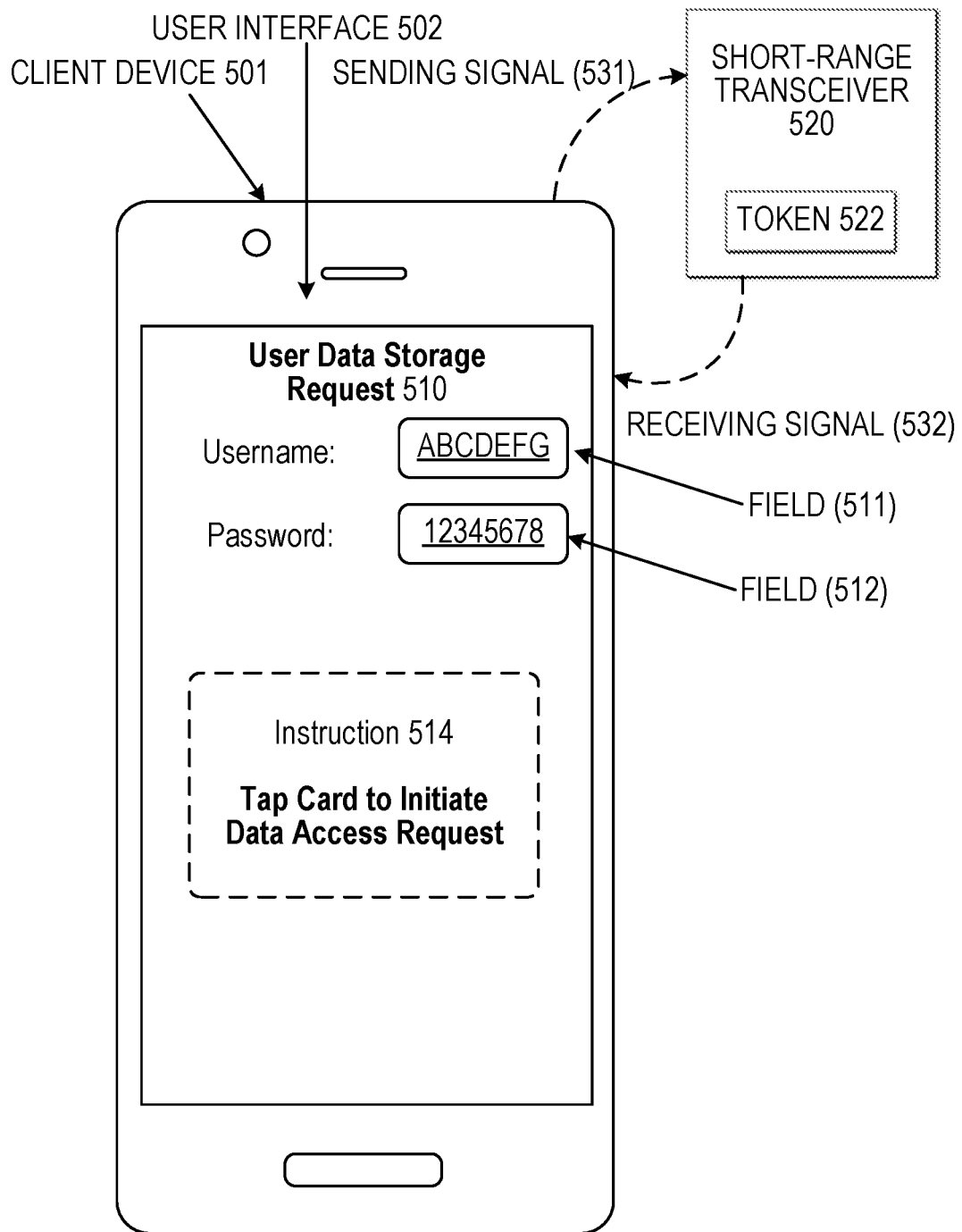
FIG. 5 is diagram illustrating interaction between a client device and a short-range transceiver used in a data access control system according to one or more example embodiments.

FIG. 5 is diagram illustrating the interaction 500 between a client device 501 and a short-range transceiver 520 used in a data access control system according to one or more example embodiments, including embodiments described above with reference to FIG. 1A and FIG. 1C. Client device 501 may be client device 101 associated with a user as described above with reference to FIG. 1A and FIG. 1C. User interface 502 may be generated by application 102 described above with reference to FIG. 1C. Short-range transceiver 520 may be short-range transceiver 105 described above with reference to FIG. 1A and FIG. 1C. Upon entry of short-range transceiver 520 into a short-range communication field of client device 501 (such as, e.g., via a tap action), client device 501 may communicate with short-range transceiver 520. Client device 501 may send data or commands to short-range transceiver 520 via transmit signal 531, and may receive data from short-range transceiver 520, including token 522, via receive signal 532. Communication between client device 501 and short-range transceiver 520 may proceed as described above with reference to FIG. 1C (e.g., client device 101 and short-range transceiver 105).

User interface 502 may present on client device 501 a screen display for a user data access request 510, which may include field 511 and field 512. If necessary, the user may enter a username in field 511 and password in field 512; in some example embodiments, the user may scan a biometric image such as a fingerprint scan, retina scan, facial scan, etc. The screen display may include an instruction 514 prompting the user to tap short-range transceiver 520 (in the example shown, short-range transceiver 520 may be a contactless card) to initiate a data access key request to obtain a data access key required to access a secure memory block as described herein. Instruction 514 may be a push notification from server 110 (shown in FIG. 1A and FIGS. 1B-1C). Client device 501 may transmit a user token 522 (from short-range transceiver 520) to server 110 in response to a tap action.

Figure 6A:
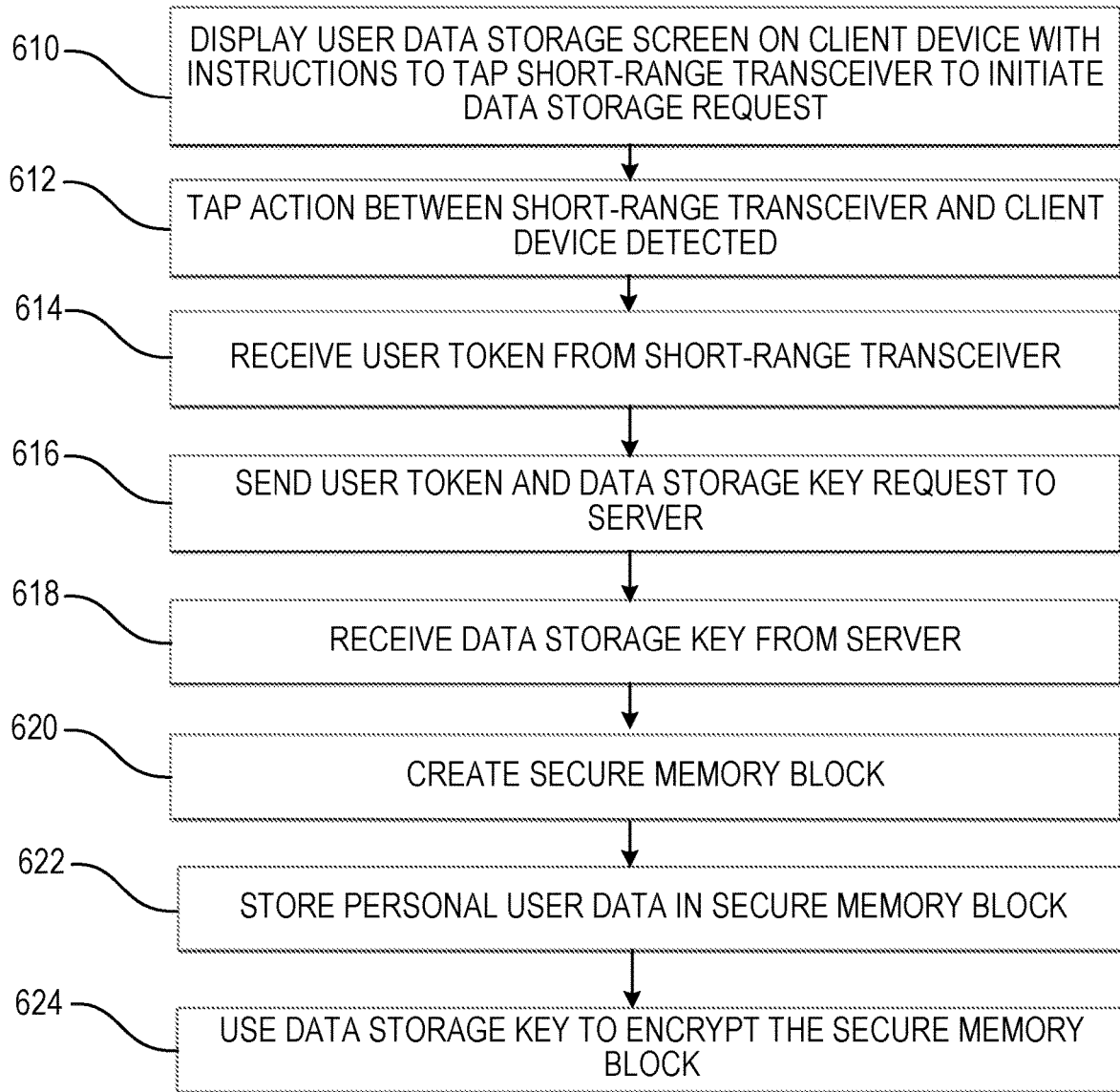
FIGS. 6A-6D provide a flowchart illustrating one or more methods of data access control according to one or more example embodiments.

FIG. 6A is a flowchart illustrating a method of data access control 600 according to one or more example embodiments, with reference to components and features described above, including but not limited to the figures and associated description. Data access control method 600 may be carried out by application 102 executing on client device 101 associated with the user. Short-range transceiver 105 is associated with the user.

At block 610, application 102 may cause client device 101 to display a user data storage request screen (such as shown in, and described above with reference to, FIG. 4). The user data storage request screen may include an instruction to tap short-range transceiver 105 with/against client device 101 to initiate a data storage key request. As described above with reference to FIG. 4, in the example shown in FIG. 4, short-range transceiver 420 (and, hence, short-range transceiver 105) may be a contactless card.

At block 612, a tap action may be detected between short-range transceiver 105 and client device 101.

At block 614, user token 107 may be received from short-range transceiver 105. Receiving user token 107 may be in response to the tap action of block 612. User token 107 may include a user identifier. In some example embodiments, user token 107 may include a user key associated with the user.

At block 616, user token 107 may be transmitted to server 110 along with a data storage key request, to obtain a data storage key for encrypting the secure memory block to be created in memory of client device 101. Transmission of user token 107 and the data storage key request to server 110 may be in response to the tap action of block 612.

At block 618, a data storage key may be received from server 110.

At block 620, the secure memory block may be created in memory of client device 101, as described above.

At block 622, personal user data may be stored in the secure memory block. In some example embodiments, personal user data may be stored in the secure memory block at a later time.

At block 624, the data storage key may be used to encrypt the secure memory block, thereby securing the secure memory block from unauthorized access.

Figure 6B:
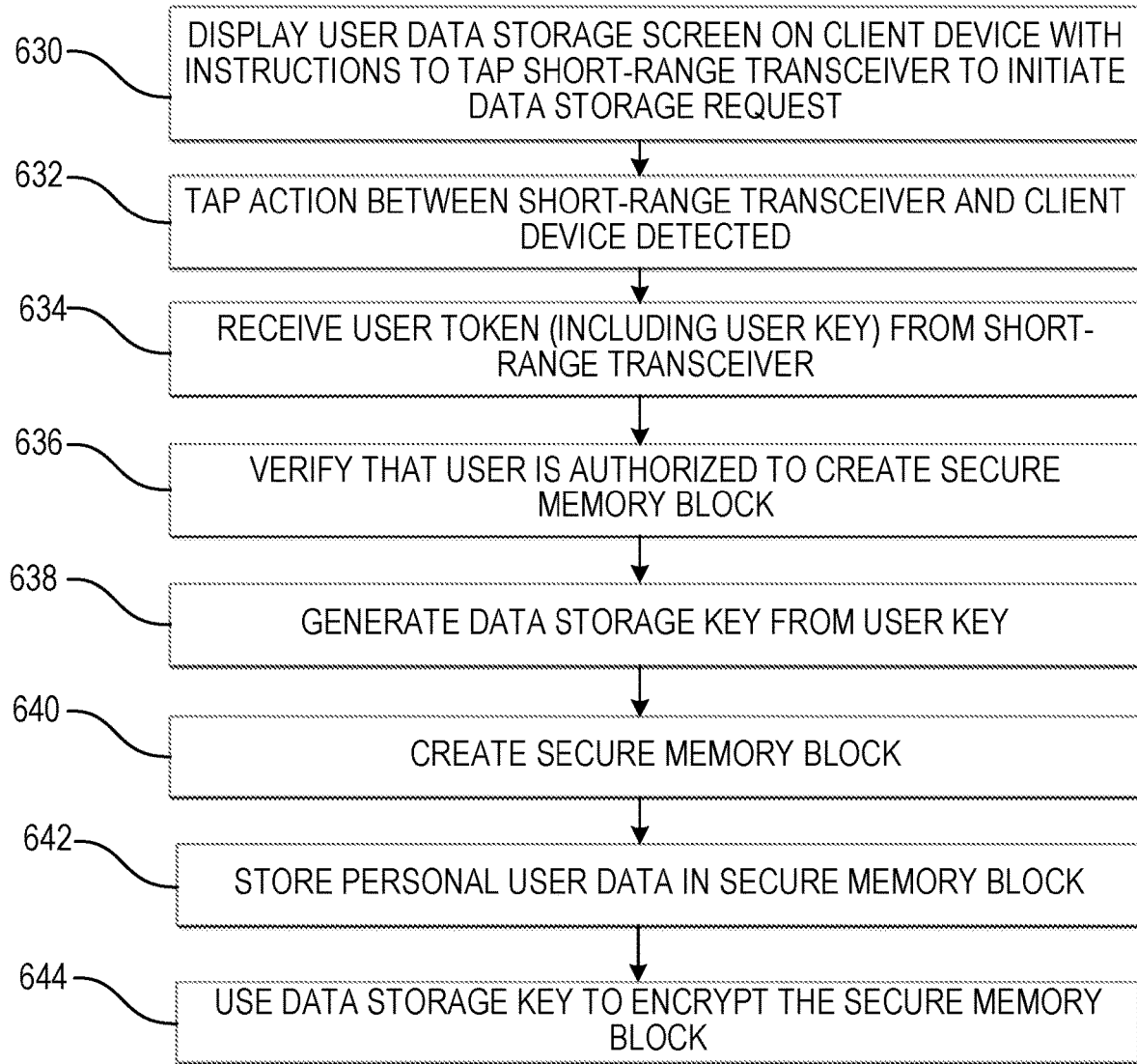

FIG. 6B is a flowchart illustrating a method of data access control 601 according to one or more example embodiments, with reference to components and features described above, including but not limited to the figures and associated description. Data access control method 601 may be carried out by application 102 executing on client device 101 associated with the user. Short-range transceiver 105 is associated with the user.

At block 630, application 102 may cause client device 101 to display a user data storage request screen (such as shown in, and described above with reference to, FIG. 4). The user data storage request screen may include an instruction to tap short-range transceiver 105 with/against client device 101 to initiate a data storage key request. As described above with reference to FIG. 4, in the example shown in FIG. 4, short-range transceiver 420 (and, hence, short-range transceiver 105) may be a contactless card.

At block 632, a tap action may be detected between short-range transceiver 105 and client device 101.

At block 634, user token 107 may be received from short-range transceiver 105. Receiving user token 107 may be in response to the tap action of block 632. User token 107 may include a user identifier. In some example embodiments, user token 107 may include a user key associated with the user.

At block 636, the user's authorization to create a secure memory block in memory of client device 101 (and thus authorization to obtain a data storage key) may be verified. Authorization may be based on the identity of the user determined, e.g., from user token 107.

At block 638, a data storage key may be received from short-range transceiver 105 or generated based on data received from short-range transceiver 105 (such as user token 107, which may include a user key, or other data which may include a second user key). In one or more example embodiments, the user key may serve as the data storage key.

At block 640, the secure memory block may be created in memory of client device 101, as described above.

At block 642, personal user data may be stored in the secure memory block. In some example embodiments, personal user data may be stored in the secure memory block at a later time.

At block 644, the data storage key may be used to encrypt the secure memory block, thereby securing the secure memory block from unauthorized access.

Figure 6C:
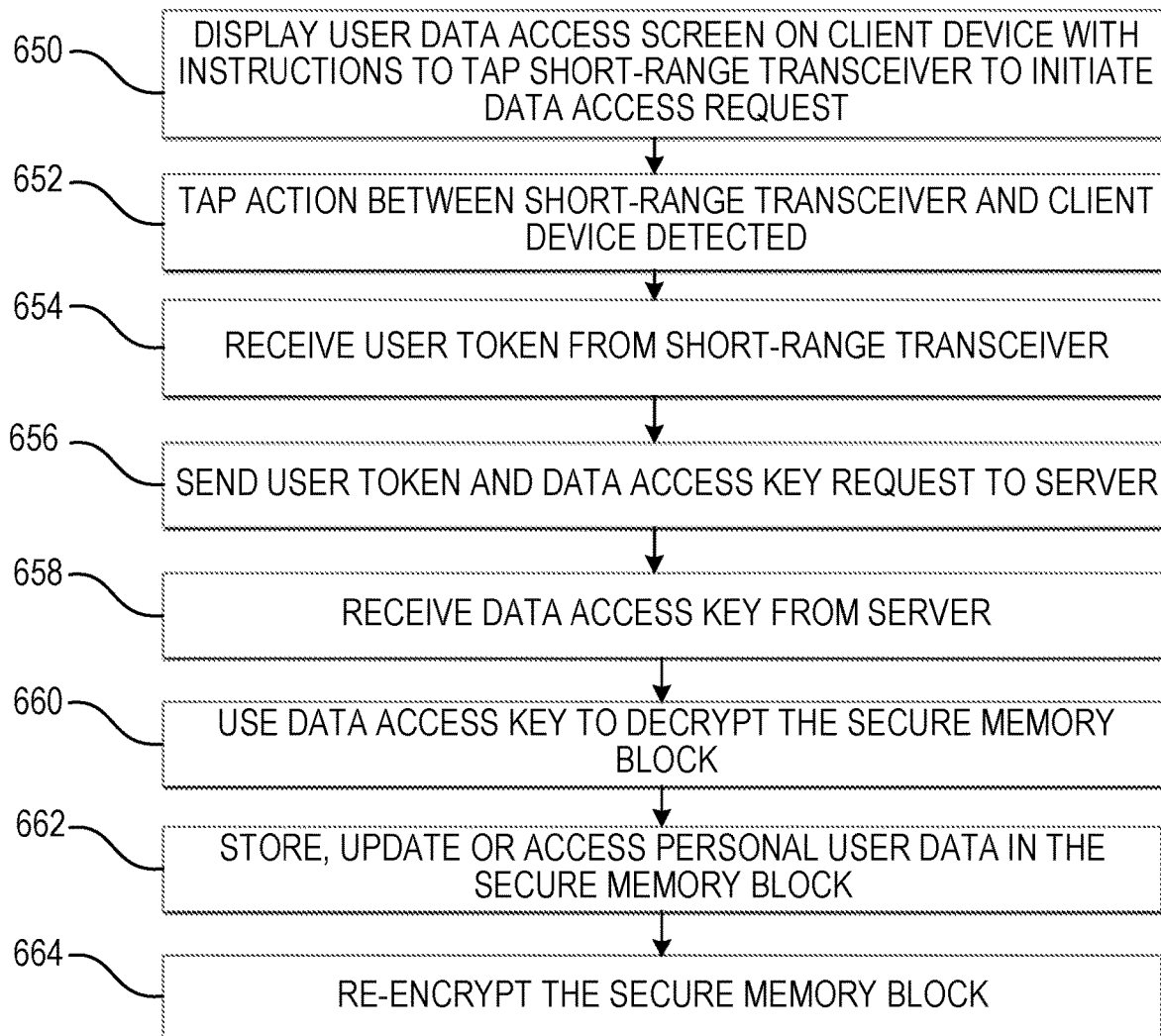

FIG. 6C is a flowchart illustrating a method of data access control 602 according to one or more example embodiments, with reference to components and features described above, including but not limited to the figures and associated description. Data access control method 602 may utilize a secure memory block previously created in client device 101 according to one or more of the embodiments described above. Data access control method 602 may be carried out by application 102 executing on client device 101 associated with the user. Short-range transceiver 105 is associated with the user.

At block 650, application 102 may cause client device 101 to display a user data access request screen (such as shown in, and described above with reference to, FIG. 5). The user data access request screen may include an instruction to tap short-range transceiver 105 with/against client device 101 to initiate a data access key request. As described above with reference to FIG. 5, in the example shown in FIG. 5, short-range transceiver 520 (and, hence, short-range transceiver 105) may be a contactless card.

At block 652, a tap action may be detected between short-range transceiver 105 and client device 101.

At block 654, user token 107 may be received from short-range transceiver 105. Receiving user token 107 may be in response to the tap action of block 652. User token 107 may include a user identifier. In some example embodiments, user token 107 may include a user key associated with the user.

At block 656, user token 107 may be transmitted to server 110 along with a data access key request, to obtain a key for decrypting the secure memory block in memory of client device 101. Transmission of user token 107 and the data access key request to server 110 may be in response to the tap action of block 652.

At block 658, a data access key may be received from server 110.

At block 660, the data access key may be used to decrypt the secure memory block, thereby allowing authorized access to the secure memory block.

At block 662, personal user data may be stored in, updated, and/or otherwise accessed from the secure memory block. Application 102 may cause the display of the personal user data on client device 101.

At block 664, the secure memory block may be re-encrypted, thereby securing the secure memory block from unauthorized access. The data storage key, the data access key, or another key generated from one or more of the data storage key, the data access key, and the user key may be used to re-encrypt the secure memory block. Re-encryption of the secure memory block may occur automatically, for example after expiration of a predetermined time period, or may occur upon user command.

Figure 6D:
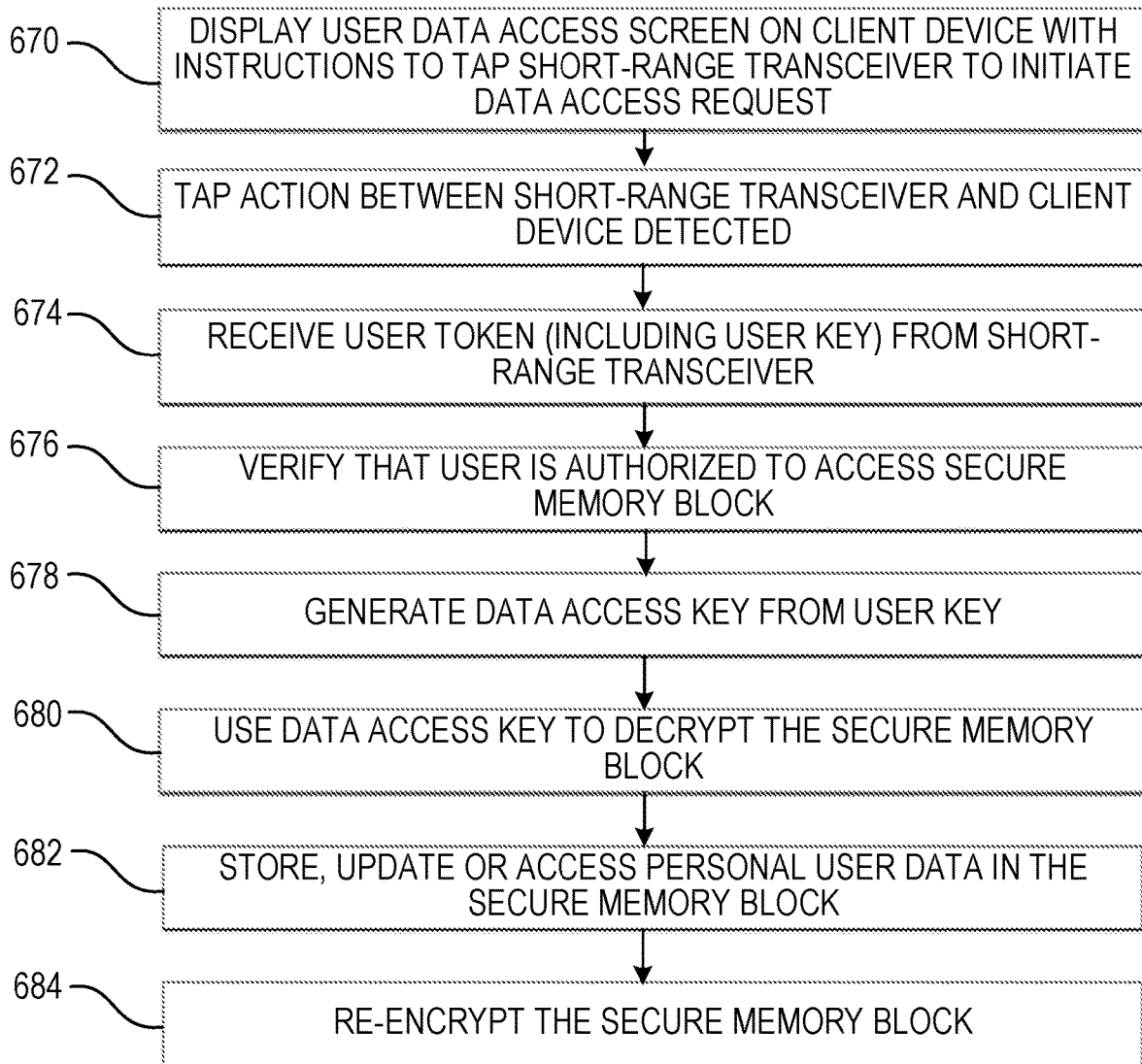

FIG. 6D is a flowchart illustrating a method of data access control 603 according to one or more example embodiments, with reference to components and features described above, including but not limited to the figures and associated description. Data access control method 603 may utilize a secure memory block previously created in client device 101 according to one or more of the embodiments described above. Data access control method 603 may be carried out by application 102 executing on client device 101 associated with the user. Short-range transceiver 105 is associated with the user.

At block 670, application 102 may cause client device 101 to display a user data access request screen (such as shown in, and described above with reference to, FIG. 5). The user data access request screen may include an instruction to tap short-range transceiver 105 with/against client device 101 to initiate a data access key request. As described above with reference to FIG. 5, in the example shown in FIG. 5, short-range transceiver 520 (and, hence, short-range transceiver 105) may be a contactless card.

At block 672, a tap action may be detected between short-range transceiver 105 and client device 101.

At block 674, user token 107 may be received from short-range transceiver 105. Receiving user token 107 may be in response to the tap action of block 672. User token 107 may include a user identifier. In some example embodiments, user token 107 may include a user key associated with the user.

At block 676, the user's authorization to access a secure memory block in memory of client device 101 (and thus authorization to obtain a data access key) may be verified. Authorization may be based on the identity of the user determined, e.g., from user token 107.

At block 678, a data access key may be received from short-range transceiver 105 or generated based on data received from short-range transceiver 105 (such as user token 107, which may include a user key, or other data which may include a second user key). In one or more example embodiments, the user key may serve as the data access key.

At block 680, the data access key may be used to decrypt the secure memory block, thereby allowing authorized access to the secure memory block.

At block 682, personal user data may be stored in, updated, and/or otherwise accessed from the secure memory block. Application 102 may cause the display of the personal user data on client device 101.

At block 684, the secure memory block may be re-encrypted, thereby securing the secure memory block from unauthorized access. The data storage key, the data access key, or another key generated from one or more of the data storage key, the data access key, and the user key may be used to re-encrypt the secure memory block. Re-encryption of the secure memory block may occur automatically, for example after expiration of a predetermined time period, or may occur upon user command.

Figure 7A:
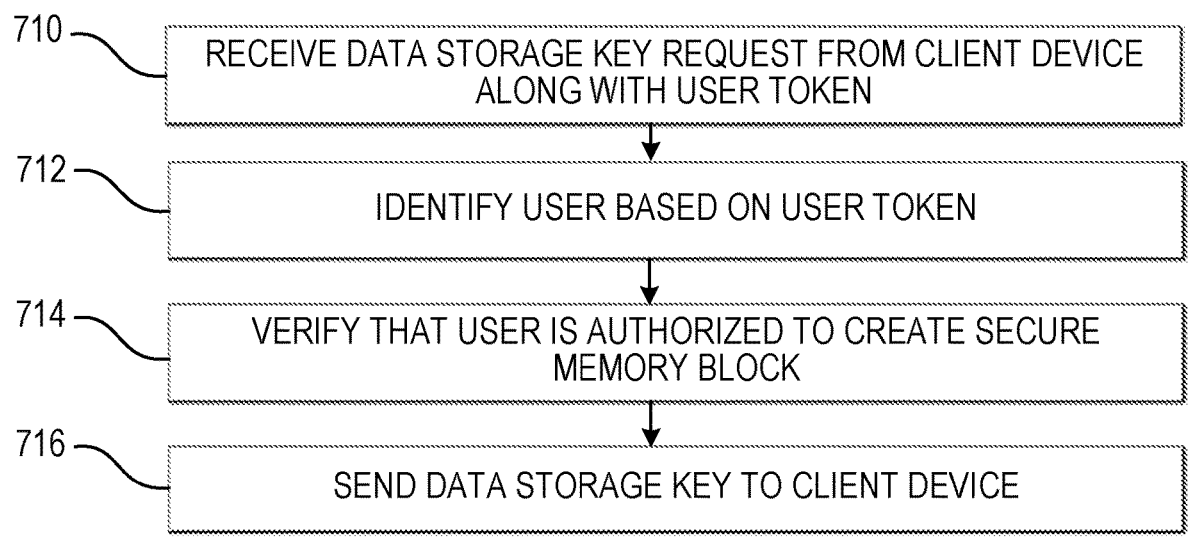
FIGS. 7A-7B provide a flowchart illustrating one or more methods of data access control according to one or more example embodiments.

FIG. 7A is a flowchart illustrating a method of data access control 700 according to one or more example embodiments, with reference to components and features described above, including but not limited to the figures and associated description. Data access control method 700 may be carried out by processor 120 in communication with, via server 110, client device 101 associated with a user.

At block 710 a data storage key request may be received, along with user token 107, from client device 101 associated with a user, requesting a data storage key to enable creating and securing a secure memory block in memory of client device 101. Token 107 may include a user identifier. In some example embodiments, token 107 may include a user key associated with the user.

At block 712, the user may be identified based on received user token 107. In some example embodiments, when token 107 includes the user key associated with the user, the user key may be used to authenticate the user.

At block 714, the processor may verify that the user is authorized to create the secure memory block (and thus authorized to obtain the data storage key). Authorization may be based on the identity of the user, and may include retrieval of information from database 130.

At block 716, a data storage key may be sent to client device 101 associated with the user. As described above, the data storage key may be stored in database 130, or may be generated based on the user key.

Figure 7B:
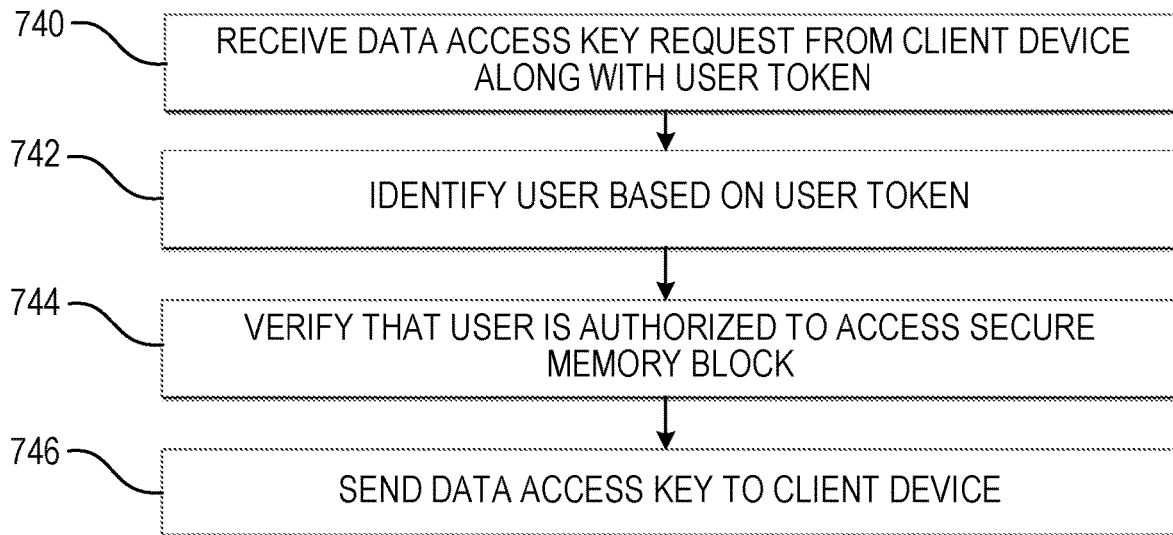

FIG. 7B is a flowchart illustrating a method of data access control 701 according to one or more example embodiments, with reference to components and features described above, including but not limited to the figures and associated description. The features described in FIG. 7B may be in addition to the features referenced in FIG. 7A. The description of blocks referenced in FIG. 7A will not be repeated here. As described above with reference to FIG. 7A, data access control method 701 may be carried out by processor 120 in communication with, via server 110, client device 101 associated with a user.

At block 740 a data access key request may be received, along with user token 107, from client device 101 associated with a user, requesting a data access key to enable access to a secure memory block in memory of client device 101. Token 107 may include a user identifier. In some example embodiments, token 107 may include a user key associated with the user.

At block 742, the user may be identified based on received user token 107. In some example embodiments, when token 107 includes the user key associated with the user, the user key may be used to authenticate the user.

At block 744, the processor may verify that the user is authorized to access the secure memory block (and thus authorized to obtain the data access key). Authorization may be based on the identity of the user, and may include retrieval of information from database 130.

At block 746, a data access key may be sent to client device 101 associated with the user. As described above, the data access key may be stored in database 130, or may be generated based on the user key.

The description of embodiments in this disclosure provides non-limiting representative examples referencing figures and numerals to particularly describe features and teachings of different aspects of the disclosure. The embodiments described should be recognized as capable of implementation separately, or in combination, with other embodiments from the description of the embodiments. A person of ordinary skill in the art reviewing the description of embodiments should be able to learn and understand the different described aspects of the disclosure. The description of embodiments should facilitate understanding of the disclosure to such an extent that other implementations, not specifically covered but within the knowledge of a person of skill in the art having read the description of embodiments, would be understood to be consistent with an application of the disclosure Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A non-transitory machine-readable medium having stored thereon an application comprising program code for execution on a client device, the client device having a secure memory block, the application configured to, when executed, perform procedures comprising:

transmitting, to a server, a user token and a request for a data access key;

receiving, from the server, the data access key;

encrypting the secure memory block using the data access key automatically after expiration of a predetermined time period; and permitting a second application on the client device to access the secure memory block.

2. The non-transitory machine-readable medium of claim 1, the procedures further comprising limiting the access of the second application to the secure memory block to a specific time.

3. The non-transitory machine-readable medium of claim 1, the procedures further comprising limiting the access of the second application to the secure memory block to a second predetermined time period.

4. The non-transitory machine-readable medium of claim 1, the procedures further comprising:
prior to receiving the data access key, receiving a validation token,
wherein the validation token is a dynamic token generated by an algorithm.

5. The non-transitory machine-readable medium of claim 4, wherein the algorithm includes an independently verifiable parameter.

6. The non-transitory machine-readable medium of claim 5, wherein the independently verifiable parameter comprises the time.

7. The non-transitory machine-readable medium of claim 5, wherein the independently verifiable parameter comprises a temperature at a location.

8. The non-transitory machine-readable medium of claim 1, the procedures further comprising storing personal user data in the secure memory block.

9. A data access control system, comprising:
a server in data communication configured for data communication with a client device comprising; and
a client application comprising program code for execution on the client device having a secure memory block storing personal user data,
wherein the client application configured to:
transmit, to the server, a user token and a request for a data access key;
receive, from the server, the data access key;
encrypt the secure memory block using the data access key automatically after expiration of a predetermined time period; and
permit a second application on the client device to access the personal user data.

10. The data access control system of claim 9, wherein the second application is executing on the client device.

11. The data access control system of claim 9, wherein the client application is further configured to, in response to a tap action between a contactless card and the client device, receive, from the contactless card, the user token.

12. The data access control system of claim 9, wherein the user token comprises a user key.

13. The data access control system of claim 9, wherein encrypting the secure memory block is performed using the data access key and the user key.

14. The data access control system of claim 11, wherein the server is further configured to:
receive the user token and the request for the data access key,
identify a user based on the user token,
verify that the user is authorized to access the secure memory block in the client device, and
transmit, to the client device, the data access key.

15. The data access control system of claim 9, wherein the server is further configured to: generate data access key based on the user key and a counter, and maintain the counter in synchronization with the client device.

16. A method for controlling data access performed by a client application executing on a client device comprising a secure memory block storing personal user data, the method comprising:
transmitting, to a server, a user token and a request for a data access key;
receiving, from the server, the data access key;
encrypting the secure memory block using the data access key automatically after expiration of a predetermined time period; and
permitting a second application on the client device to access the personal user data.

17. The method of claim 16, further comprising limiting the access of the second application to the personal user data to a specific time.

18. The method of claim 16, further comprising limiting the access of the second application to the personal user data to a second predetermined time period.

19. The method of claim 16, further comprising receiving from a contactless card in response to a tap action between the contactless card and the client device, the user token.

20. The method of claim 16, wherein:
the user token comprises a user key, and
encrypting the secure memory block is performed using the data access key and the user key.

* * * * *